US011132633B2

(12) United States Patent
Tulabandhula et al.

(10) Patent No.: US 11,132,633 B2
(45) Date of Patent: Sep. 28, 2021

(54) METHOD AND SYSTEM FOR CONTROLLING KEY PERFORMANCE INDICATOR PARAMETERS OF A TRANSPORTATION SYSTEM

(71) Applicant: Conduent Business Services, LLC, Dallas, TX (US)

(72) Inventors: Theja Tulabandhula, Bangalore (IN); Asim Anand, Bangalore (IN); Deeksha Sinha, Cambridge, MA (US)

(73) Assignee: Conduent Business Services, LLC, Florham Park, NJ (US)

( * ) Notice: Subject to any disclaimer, the term of this patent is extended or adjusted under 35 U.S.C. 154(b) by 1059 days.

(21) Appl. No.: 15/381,144

(22) Filed: Dec. 16, 2016

(65) Prior Publication Data

US 2018/0174089 A1    Jun. 21, 2018

(51) Int. Cl.
*G06Q 10/06* (2012.01)
*G06N 5/02* (2006.01)

(52) U.S. Cl.
CPC ....... *G06Q 10/06393* (2013.01); *G06N 5/022* (2013.01); *G06Q 10/06314* (2013.01)

(58) Field of Classification Search
None
See application file for complete search history.

(56) References Cited

U.S. PATENT DOCUMENTS

| 7,010,788 | B1* | 3/2006 | Rehg | G06F 9/4881 712/208 |
| 8,504,402 | B1* | 8/2013 | Tiao | G06Q 10/06 705/7.12 |
| 8,700,438 | B1* | 4/2014 | Heinold | G06Q 50/30 705/7.12 |
| 2009/0187449 | A1* | 7/2009 | van Tulder | G06Q 10/06 705/7.17 |
| 2015/0066594 | A1* | 3/2015 | Li | G06Q 30/0202 705/7.31 |
| 2016/0117610 | A1* | 4/2016 | Ikeda | G06Q 10/02 705/5 |
| 2016/0125431 | A1* | 5/2016 | Miller | G06Q 30/0201 705/7.29 |
| 2017/0323403 | A1* | 11/2017 | Johnson | G06Q 10/06315 |

\* cited by examiner

*Primary Examiner* — Alan Torrico-Lopez
(74) *Attorney, Agent, or Firm* — Jones Robb, PLLC

(57) ABSTRACT

The disclosed embodiments illustrate a method and a system for controlling KPI parameters of a transportation system. The method includes extracting historical commuting characteristics of one or more commuters, from a database server over a communication network. The method further includes generating a predictive model based on the extracted historical commuting characteristics. The method further includes generating a service schedule of one or more transportation services of the transportation system. The service schedule of the one or more transportation services may be generated by use of the generated predictive model, based on defined criteria of the transportation system. The method further includes controlling a KPI parameter of the transportation system to attain a desired KPI parameter of the KPI parameter, based on the generated service schedule, when the one or more transportation services are deployed at one or more time stamps.

19 Claims, 4 Drawing Sheets

METHOD AND SYSTEM FOR CONTROLLING KEY PERFORMANCE INDICATOR PARAMETERS OF A TRANSPORTATION SYSTEM

TECHNICAL FIELD

The presently disclosed embodiments are related, in general, to transportation services. More particularly, the presently disclosed embodiments are related to methods and systems for controlling the key performance indicator (KPI) parameters of a transportation system.

BACKGROUND

With an increase in the variety of services that can potentially be offered to commuters, the decision of which assortment of transportation services (differentiated by their types, prices, and timings) to offer to customers may become exhaustive and time consuming for service providers. In addition to transportation services, such problems may be encountered in other industries, such as airline industry, hotel industry, brick and mortar stores, online retailers, and/or the like. Most of the current solutions for such problem work when the number of different services or products are not on a large scale.

However, in today's competitive era, the different transportation services offered to the commuters at a given time may affect their behavior with respect to the selection of the offered transportation services. Sometimes, such behavior of the customers may not go well with the expectations of the service providers, and thus, may affect a service provider's revenue. In current scenarios, many available solutions are static, and therefore, work only when the customer's behavior with respect to the various services are known in advance. However, as the number of services encountered in real-time diversify at a very large scale (for instance, at the level of a city or a continent for transportation services), an automatic and robust technique may be required to provide a method with low computational complexity to deal with assortment optimization problems with a large number of services.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for controlling key performance indicator (KPI) parameters of a transportation system, by a computing server. The method includes extracting, by a data extracting processor at the computing server, historical commuting characteristics of one or more commuters, from a database server over a communication network. The historical commuting characteristics of the one or more commuters may be extracted based on a first user-defined time duration. The method further includes generating, by a model generating processor at the computing server, a predictive model based on the extracted historical commuting characteristics of the one or more commuters. The method further includes generating, by a schedule generating processor at the computing server, a service schedule of one or more transportation services of the transportation system for a second user-defined time duration. The service schedule of the one or more transportation services may be generated by use of the generated predictive model, based on defined criteria of the transportation system. The defined criteria may comprise one or more parameters based on at least one of a count, a type, and a capacity of the one or more transportation services to be deployed by the transportation system during the second user-defined time duration. The method further includes controlling, by a processor at the computing server, a KPI parameter of the transportation system, based on the generated service schedule. The KPI parameter may be controlled to attain a desired KPI parameter of the KPI parameter, when the one or more transportation services are deployed at one or more time stamps in the second user-defined time duration based on the generated service schedule.

According to embodiments illustrated herein, there is provided a system for controlling key performance indicator (KPI) parameters of a transportation system. The system may correspond to a computing server that includes a data extracting processor. The data extracting processor may be configured to extract historical commuting characteristics of one or more commuters, from a database server over a communication network. The historical commuting characteristics of the one or more commuters may be extracted based on a first user-defined time duration. The system further includes a model generating processor that may be configured to generate a predictive model based on the extracted historical commuting characteristics of the one or more commuters. The system further includes a schedule generating processor that may be configured to generate a service schedule of one or more transportation services of the transportation system for a second user-defined time duration. The service schedule of the one or more transportation services may be generated by use of the generated predictive model, based on defined criteria of the transportation system. The defined criteria may comprise one or more parameters based on at least one of a count, a type, and a capacity of the one or more transportation services to be deployed by the transportation system during the second user-defined time duration. Further, the system includes a processor that may be configured to control a KPI parameter of the transportation system, based on the generated service schedule. The KPI parameter may be controlled to attain a desired KPI parameter of the KPI parameter, when the one or more transportation services are deployed at one or more time stamps in the second user-defined time duration based on the generated service schedule.

According to embodiments illustrated herein, there is provided a computer program product for use with a computing device. The computer program product comprises a non-transitory computer readable medium storing a computer program code for controlling key performance indicator (KPI) parameters of a transportation system. The computer program code is executable by one or more processors in a computing device to extract historical commuting characteristics of one or more commuters, from a database server over a communication network. The historical commuting characteristics of the one or more commuters may be extracted based on a first user-defined time duration. The computer program code is further executable by the one or more processors to generate a predictive model based on the extracted historical commuting characteristics of the one or more commuters. The computer program code is further executable by the one or more processors to generate a service schedule of one or more transportation services of the transportation system for a second user-defined time duration. The service schedule of the one or more transportation services may be generated by use of the generated predictive model, based on defined criteria of the transportation system. The defined criteria may comprise one or more parameters based on at least one of a count, a type, and a capacity of the one or more transportation services to be deployed by the transportation system during the second user-defined time duration. The computer program code is further executable by the one or more processors to control a KPI parameter of the transportation system, based on the generated service schedule. The KPI parameter may be controlled to attain a desired KPI parameter of the KPI parameter, when the one or more transportation services are deployed at one or more time stamps in the second user-defined time duration based on the generated service schedule.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
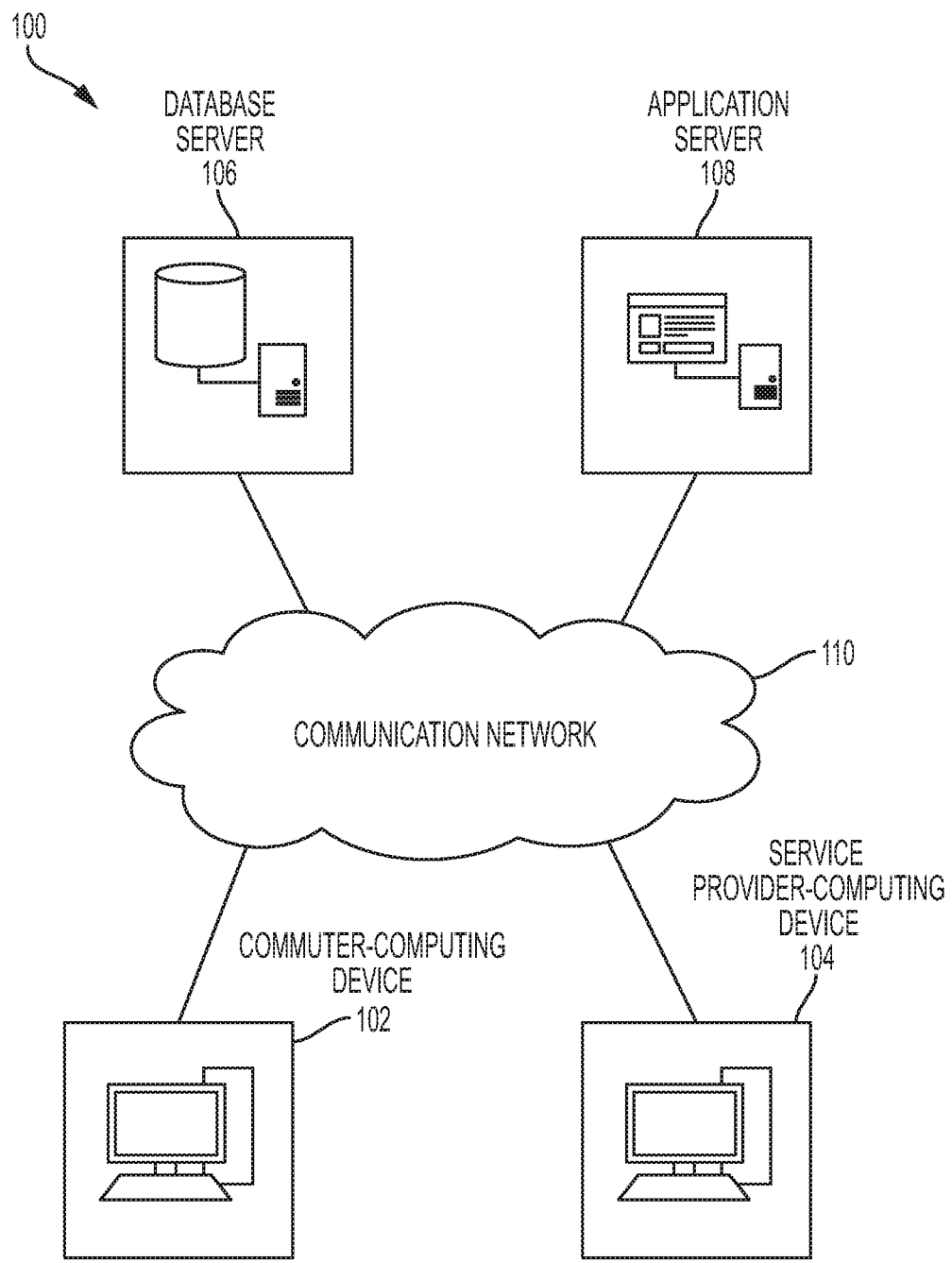
FIG. 1 is a block diagram that illustrates an exemplary system environment, in which various embodiments of the disclosed method and system to control the KPI parameters of a transportation system can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "commuter-computing device" may refer to a computer, a device (that includes one or more processors/microcontrollers and/or any other electronic components), or a system (that performs one or more operations according to one or more programming instructions/codes) associated with a commuter. The commuter may correspond to an individual, who may be interested in renting a transportation service, such as a bus or a car, to travel from one location to another location. Based on an input provided by the commuter, the commuter-computing device may present a graphical user interface (GUI) to the commuter for facilitating real-time (or non-real time) transportation services provided by a service provider. Based on the presented GUI, the commuter may share preferences for one or more transportation services. Further, the commuter may provide input to select, accept, or reject the one or more transportation services provided by a service provider. Examples of the commuter-computing device may include, but are not limited to, a laptop, a personal digital assistant (PDA), a mobile device, a smartphone, and a tablet computer (e.g., iPad® and Samsung Galaxy Tab®).

A "service provider-computing device" may refer to a computer, a device (that includes one or more processors/microcontrollers and/or any other electronic components), or a system (that performs one or more operations according to one or more programming instructions/codes) associated with a service provider. The service provider may correspond to an individual, who is facilitating one or more transportation services (e.g., buses, cars, motor bikes, and so on) to one or more commuters for travel between at least two locations. The service provider-computing device may present a GUI to the service provider for displaying one or more travel requests received from one or more commuter-computing devices. Further, the service provider-computing device may present another GUI to the service provider for displaying a schedule of one or more transportation services. Further, the service provider-computing device may present yet another GUI to the service provider for displaying the real-time status of one or more KPI parameters, such as revenue or profit, based on deployment of the one or more transportation services according to the schedule. The service provider may further utilize the service provider-computing device to input one or more offerings, such as a discounted service price, that may be offered to one or more commuters either for a real-time service or a non-real time service. Examples of the service provider-computing device may include, but are not limited to, a laptop, a PDA, a mobile device, a smartphone, and a tablet computer (e.g., iPad® and Samsung Galaxy Tab®).

"Transportation system" may correspond to transport facilities that may offer one or more means of transport to a commuter to travel from one location to another location. In an embodiment, the transportation system may correspond to a public transportation system, a private transportation system, a shared transportation system, and/or the like. Examples of various transportation systems may include one or more transportation services such as, but are not limited to, a bus transportation service, a train transportation service, a car transportation service, a motor bike transportation service, or an airplane transportation services. Hereinafter, "transportation system" and "transportation agency" may be interchangeably used.

A "route" may refer to a path that may be traversed by a vehicle, while in transit. In an embodiment, the route may include a plurality of stations that may come in a defined order in the route. For example, a city bus travels from Harlem to East Village in New York. Thus, the path from Harlem to East Village may correspond to the route with Harlem and East Village being the plurality of stations. Further, the plurality of stations may include at least one pick-up station and one drop-off station.

A "vehicle" may refer to a type of transportation services that may transport one or more commuters and/or cargos between two or more stations along a route of transit. In an embodiment, the one or more commuters may share the vehicle with one or more other commuters during the transit along the route. In an embodiment, the vehicle may be installed with a vehicle-computing device and one or more sensors, such as a global positioning system. In an embodiment, the vehicle may correspond to a bus, a truck, a car, a ship, an airplane, a motor bike, and/or the like.

A "commuter" may refer to an individual who may wish to avail a transportation service to travel from a source station to a destination station among a plurality of stations along a route. For example, an individual wants to travel from "New Delhi" to "Gurgaon." The individual may avail a transportation service, such as a bus service, for the travel. The individual may board a city bus, which is in transit from "New Delhi" to "Gurgaon," from "New Delhi." The individual may further alight the city bus at "Gurgaon." The individual may have to pay a certain service fare for availing the transportation service. In this scenario, the individual may correspond to the commuter.

A "service provider" may refer to an entity who may wish to provide a transportation service to one or more commuters to travel from a source station to a destination station among a plurality of stations along a route, based on a request provided by the one or more commuters. For example, a commuter utilizes an application or a web page on a commuter-computing device to input a request to travel from "a first station" to "a second station." Based on the request, the service provider may utilize the service provider-computing device to provide one or more available transportation services to the commuter.

A "KPI parameter" may refer to a parameter that may be used to evaluate one or more factors that define the growth or success of an entity, such as a transportation agency. Examples of the KPI parameter may include at least one of, but are not limited to, net revenue generated by one or more transportation services, profit earned by the transportation agency based on deployment of the one or more transportation services along one or more routes at one or more time instances, and count of commuters carried by the one or more transportation services. In an embodiment, the service provider associated with the transportation agency may wish to continuously optimize the KPI parameter for the continuous growth of the transportation agency. For example, the optimization of the KPI parameter may refer to the maximization of the revenue generated or a maximization of the profit earned.

"Historical commuting characteristics" may refer to commuting behaviors or patterns of one or more commuters, who may have traveled between at least two locations using one or more transportation services in the past. The commuting behavior or pattern may be dependent upon at least one of, but not limited to, a source station, a destination station, a travel time, a travel cost, a service capacity, and a travel route. For example, "25 commuters" board a bus at 9 AM for five days a week (e.g., Monday to Friday) to travel from "station-A" to "station-B." The "25 commuters" board the bus in an event the bus is not overcrowded and the service price is not more than "USD 5." In such scenario, the historical commuting characteristics of the "25 commuters" may include characteristics, such as "source station: station-A," "destination station: station-B," "travel time: 9 AM," "Frequency of travel: Monday to Friday," "travel constraint: avoid overcrowd bus," and "service price: less than USD 5."

A "predictive model" may refer to a random utility choice model, which may enable prediction of a schedule of one or more transportation services at one or more time instances so as to optimize one or more KPI parameters of a transportation agency. In an embodiment, the predictive model may be generated based on historical commuting characteristics of one or more commuters. The predictive model may employ one or more techniques such as, but not limited to, one or more statistical techniques, one or more natural language processing techniques, one or more neural network techniques, and/or one or more machine learning techniques to predict the schedule of the one or more transportation services. For example, the predictive model may correspond to a multinomial logit (MNL) model that may be configured to capture the historical commuting characteristics of the one or more commuters. The MNL model may quickly solve an assortment optimization problem, for example, five times faster than integer programming algorithms.

A "service schedule" may refer to a plan or a timetable of carrying out one or more services or processes. For example, a service schedule for a transportation agency may include one or more time instances at which one or more transportation services may be deployed for transit along one or more routes. In an embodiment, the service schedule for the transportation agency may be generated based on at least historical commuting characteristics of one or more commuters, a defined time duration, an availability of one or more types of the one or more transportation services for the defined time duration, and/or a capacity in each of the one or more types of the one or more transportation services.

A "first defined time duration" may refer to a time interval that is defined by an individual, for example, a service provider associated with a transportation agency. The service provider may define the first time duration either in real time or near-real time. In an embodiment, a computing server may extract historical commuting characteristics of one or more commuters based on the first defined time duration. For example, the extraction of the historical commuting characteristics of the one or more commuters from a storage server may be limited by the first defined time duration. Hereinafter, "first defined time duration," and "first user-defined time duration" may be interchangeably used.

A "second defined time duration" may refer to a time interval that is defined by an individual, for example, a service provider associated with a transportation agency. The service provider may define the second time duration either in real time or near-real time. In an embodiment, a computing server may generate a service schedule for the transportation agency based on at least the second defined time duration. The second defined time duration may include one or more time stamps at which one or more transportation services may transit along one or more routes.

"Defined criteria of a transportation system" may refer to a set of rules, instructions, measures, or standards that are defined by an individual, such as a service provider associated with the transportation system, that may be utilized to generate a service schedule. The defined criteria of the transportation system may comprise one or more parameters based on at least one of a count, a type, and a capacity of the one or more transportation services to be deployed by the transportation system during a second defined time duration.

"Service capacity" may refer to the maximum count of commuters a transportation service, for example, a bus can accommodate. For example, a city bus can accommodate a maximum of 15 commuters at any given time instant. In this scenario, the service capacity of the city bus is "15." Hereinafter, "service capacity," "vehicle capacity," and "transport capacity" may be interchangeably used.

"Service cost" may refer to a monetary value that a commuter may have to pay to an individual, such as a service provider, in exchange for using a transportation service, for example, a car. Hereinafter, "service cost" and "travel cost" may be interchangeably used.

"Travel time" may refer to the time duration required to a travel between at least two locations, such as a source location and a destination location, by a transportation service, such as a bus. Hereinafter, "travel time" and "service time" may be interchangeably used.

A "source station" may refer to a location from where a journey starts along a route. The source station may be associated with a transportation service and a commuter. In an embodiment, the source station of the commuter and the transportation service may or may not be same. For example, a transportation service provided by a vehicle, such as a bus, originates from "station-A" and terminates at "station-B." There are five intermediate stations between "station-A" and "station-B," for example, "station-1," "station-2," "station-3," "station-4," and "station-5." Therefore, in an event the commuter boarded the bus at "station-A," then the source station of the commuter and the transportation service is the same. However, in an event the commuter boarded the bus at "station-2," the source station of the commuter and the transportation service is not the same. Hereinafter, "source station" and "source location" may be interchangeably used.

A "destination station" may refer to a location at which an ongoing journey terminates. The destination station may be associated with a transportation service and a commuter. In an embodiment, the destination station of the commuter and the transportation service may or may not be same. For example, a transportation service, such as a bus, originates from "station-A" and terminates at "station-B." There are five intermediate stations between "station-A" and "station-B," for example, "station-1," "station-2," "station-3," "station-4," and "station-5." Therefore, in an event the commuter ends the journey and gets down from the bus at "station-B," the destination station of the commuter and the transportation service is the same. However, in an event the commuter ends the journey and gets down from the bus at "station-4," the source station of the commuter and the transportation service is not the same. Hereinafter, "destination station" and "destination location" may be interchangeably used.

A "commuter preference vector" may refer to a set of numerical values, in which each numerical value defines a preference of a commuter for travel along a route by a transportation service. In an embodiment, the commuter preference vector may be generated based on historical commuting characteristics of one or more commuters.

A "service cost vector" may refer to a set of numerical values, in which each numerical value defines a travel price for traveling between a source location and a destination location by a transportation service. In an embodiment, the service cost vector may be generated based on the travel cost associated with each of the one or more transportation services of a transportation system.

FIG. 1 is a block diagram that illustrates an exemplary system environment, in which various embodiments of the disclosed method and system to control KPI parameters of a transportation system can be implemented. With reference to FIG. 1, there is shown a system environment 100 that includes a commuter-computing device 102, a service provider-computing device 104, a database server 106, and an application server 108. The system environment 100 further includes a communication network 110. Various devices in the system environment 100 may be interconnected over the communication network 110, as shown. FIG. 1 shows, for simplicity, one commuter-computing device, such as the commuter-computing device 102, one service provider-computing device, such as the service provider-computing device 104, one database server, such as the database server 106, and one application server, such as the application server 108. However, it will be apparent to a person having ordinary skills in the art that the disclosed embodiments may also be implemented using multiple commuter-computing devices, multiple service provider-computing devices, multiple database servers, and multiple application servers without departing from the scope of the disclosure.

The commuter-computing device 102 may refer to a computing device that includes one or more processors in communication with one or more memory units. Further, in an embodiment, the one or more processors may be operable to execute one or more sets of computer-readable code, instructions, programs, or algorithms that are stored in the one or more memory units to perform one or more operations. The commuter-computing device 102 may be further communicatively coupled to other devices over the communication network 110. The commuter-computing device 102 may be associated with a user, such as a commuter or a traveler, who may be interested in renting a transportation service, such as a bus or a car, to travel from one location to another location. In such scenario, the commuter may utilize the commuter-computing device 102 to input a travel request. The travel request may comprise travel-related information, such as information associated with a source location, a destination location, a travel time, a waiting time, a travel route, and/or the like. The commuter may further utilize the commuter-computing device 102 to provide one or more preferences for one or more transportation services, such as a bus, a car, a motor bike, and/or the like. The one or more preferences may indicate preferences for one or more types of the one or more transportation services. For example, for a transportation service, such as a car, the various types may correspond to a mini car, a compact car, a hatchback car, a mid-size car, a sedan car, an executive car, a premium car, and/or the like. The commuter-computing device 102 may further transmit the travel request and the one or more preferences provided by the commuter to the application server 108, via the communication network 110.

The commuter-computing device 102 may further include a display screen that may be configured to display one or more travel options in response to the travel request of the commuter, at a graphical user interface (GUI) rendered by the application server 108 over the communication network 110. For example, the application server 108 may render a GUI displaying the one or more types of one or more available transportation services, a service cost for using each of the one or more available transportation services, expected time duration for reaching the destination location, and/or the like. Based on the displayed information on the GUI, the commuter may utilize the commuter-computing device 102 to either accept or reject the one or more travel options rendered at the GUI.

Examples of the commuter-computing device 102 may include, but are not limited to, a personal computer, a laptop, a PDA, a mobile device, a tablet, or other such computing devices.

The service provider-computing device 104 may refer to a computing device that includes one or more processors in communication with one or more memory units. Further, in an embodiment, the one or more processors may be operable to execute one or more sets of computer-readable code, instructions, programs, or algorithms that are stored in the one or more memory units to perform one or more operations. The service provider-computing device 104 may be further communicatively coupled to other devices over the communication network 110. The service provider-computing device 104 may be associated with a user, such as a service provider of a transportation system, who may be involved in facilitating the one or more transportation services to one or more commuters. The service provider may utilize the service provider-computing device 104 to view one or more travel requests received from one or more commuter-computing devices, such as the commuter-computing device 102. Based on the received one or more travel requests, the service provider may utilize the service provider-computing device 104 to provide a schedule request that may be transmitted to the application server 108 over the communication network 110.

The service provider-computing device 104 may further include a display screen that may be configured to display a service schedule generated by the application server 108. Further, the display screen may display real-time status of the one or more transportation services. The display screen may further display the real-time status of one or more KPI parameters, such as revenue or profit, which may have been attained based on deployment of the one or more transportation services according to the generated service schedule.

Examples of the service provider-computing device 104 may include, but are not limited to, a personal computer, a laptop, a PDA, a mobile device, a tablet, or other such computing devices.

The database server 106 may refer to a computing device or a storage server that may be communicatively coupled to the communication network 110. In an embodiment, the database server 106 may be configured to perform one or more database operations. The one or more database operations may include one or more of, but are not limited to, receiving, storing, processing, and transmitting one or more queries, data, or content. The one or more queries, data, or content may be received/transmitted from/to various components of the system environment 100. For example, the database server 106 may be configured to store the one or more travel requests and the one or more preferences of the one or more commuters. The database server 106 may further store historical commuting characteristics of the one or more commuters, who may have traveled between at least two locations using the one or more transportation services in the past. The historical commuting characteristics may be dependent upon at least one of, but not limited to, a source location, a destination location, a travel time, a travel cost, a service capacity, and a travel route. Further, in an embodiment, the database server 106 may store historical demand data for the one or more transportation services. The historical demand data may comprise information pertaining to a demand for the one or more transportation services along one or more routes. The historical demand data may be received from one or more data acquisition devices installed at each of a plurality of stations along the one or more routes, over the communication network 110. Such historical demand data may constitute the historical commuting characteristics. The database server 106 may be further configured to store the one or more KPI parameters specified by the service provider. The one or more KPI parameters may be correspond to one or more valuation parameters that are utilized to define the growth of the transportation system. For example, the one or more KPI parameters may correspond to one or more of, but are not limited to, net revenue generated and net profit earned by the transportation system based on deployment of the one or more transportation services along the one or more routes at one or more time instances. The one or more KPI parameters may further correspond to a count of commuters carried by the one or more transportation services. In an embodiment, the database server 106 may be configured to receive one or more queries from the application server 108 for the retrieval of the one or more travel requests, the one or more preferences, the historical commuting characteristics, the one or more KPI parameters, and/or the like.

For querying the database server 106, one or more querying languages, such as, but not limited to, SQL, QUEL, and DMX, may be utilized. In an embodiment, the database server 106 may connect to the application server 108, using one or more protocols, such as, but not limited to, the ODBC protocol and the JDBC protocol. In an embodiment, the database server 106 may be realized through various technologies such as, but not limited to, Microsoft® SQL Server, Oracle®, IBM DB2®, Microsoft Access®, PostgreSQL®, MySQL®, and SQLite®.

The application server 108 may refer to an electronic device, a computing device, or a software framework hosting an application or a software service that may be communicatively coupled to the communication network 110. In an embodiment, the application server 108 may be implemented to execute one or more sets of instructions, programs, routines, scripts, code, and/or the like, stored in one or more memory units for supporting the hosted application or the software service. In an embodiment, the hosted application or the software service may be configured to perform one or more operations for controlling the one or more KPI parameters of the transportation system.

The application server 108 may be configured to query the database server 106 to retrieve the historical commuting characteristics of the one or more commuters. The retrieval of the historical commuting characteristics may be limited by a first defined time duration. In an alternate embodiment, the application server 108 may receive the historical commuting characteristics from the one or more data acquisition devices installed at each of the plurality of stations. The one or more data acquisition devices may correspond to one or more computerized ticketing systems and one or more image capturing devices installed at each of the plurality of stations and the one or more transportation services. The retrieval of the historical commuting characteristics has been described in detail, for example, in FIG. 3.

Further, in an embodiment, the application server 108 may be configured to generate a predictive model. The predictive model may be generated based on the retrieved (or received) historical commuting characteristics of the one or more commuters. The predictive model may correspond to a random utility choice model. For example, the predictive model may correspond to an MNL model that may be configured to capture the historical commuting characteristics to generate the service schedule of the one or more transportation services. The generation of the predictive model has been described in detail, for example, in FIG. 3, FIG. 4A, and FIG. 4B.

In an embodiment, the application server 108 may be configured to generate the service schedule of the one or more transportation services for a second defined time duration, by use of the generated predictive model, for example, the MNL model trained on the historical commuting characteristics. The generation of the service schedule of the one or more transportation services may be further based on criteria of the transportation system defined by the service provider. The defined criteria may comprise one or more parameters based on at least one of a count, a type, and a capacity of the one or more transportation services. The generation of the service schedule has been described in detail, for example, in FIG. 3, FIG. 4A, and FIG. 4B.

In an embodiment, the application server 108 may be configured to control the one or more KPI parameters of the transportation system, based on the generated service schedule, when the one or more transportation services may be deployed at one or more time stamps in the second user-defined time duration. The one or more KPI parameters may be controlled to attain at least one or more desired KPI parameters specified by the service provider. In another embodiment, the application server 108 may generate the service schedule by use of the predictive model, such that the one or more desired KPI parameters may be attained when the one or more transportation services are deployed based on the generated service schedule. The controlling of the one or more KPI parameters has been described in detail, for example, in FIG. 3, FIG. 4A, and FIG. 4B.

In an embodiment, the application server 108 may further receive real-time feedback data from a service provider-computing device 104 associated with the service provider of the transportation system over the communication network 110. The received real-time feedback data may be associated with a current status of the one or more KPI parameters that is obtained based on the deployment of the one or more transportation services at a time stamp in the second defined time duration. In an event the one or more KPI parameters are less than the one or more desired KPI parameters, the application server 108 may update the generated predictive model based on the received real-time feedback data. The application server 108 may further update the generated service schedule at one or more other time stamps in the second defined time duration, based on the updated predictive model. The updating of the predictive model and the service schedule have been described in detail, for example, in FIG. 3, FIG. 4A, and FIG. 4B.

The application server 108 may be realized through various types of application servers, such as, but not limited to, a Java application server, a .NET framework application server, a Base4 application server, a PHP framework application server, or any other application server framework.

A person having ordinary skill in the art will appreciate that the scope of the disclosure is not limited to realizing the application server 108 and the database server 106 as separate entities. In an embodiment, the functionalities of the database server 106 may be integrated into the application server 108, without departing from the scope of the disclosure. Further, in an embodiment, the application server 108 may be realized as an application program installed and/or running on the service provider-computing device 104, without limiting the scope of the disclosure.

The communication network 110 may correspond to a medium through which queries, content, and messages flow among various devices, such as the commuter-computing device 102, the service provider-computing device 104, the database server 106, and the application server 108, of the system environment 100. Examples of the communication network 110 may include, but are not limited to, a the Internet, a cloud network, a Long Term Evolution (LTE) network, Wireless Fidelity (Wi-Fi) network, a Wireless Area Network (WAN), a Local Area Network (LAN), or a Metropolitan Area Network (MAN). Various devices in the system environment 100 can connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

Figure 2:
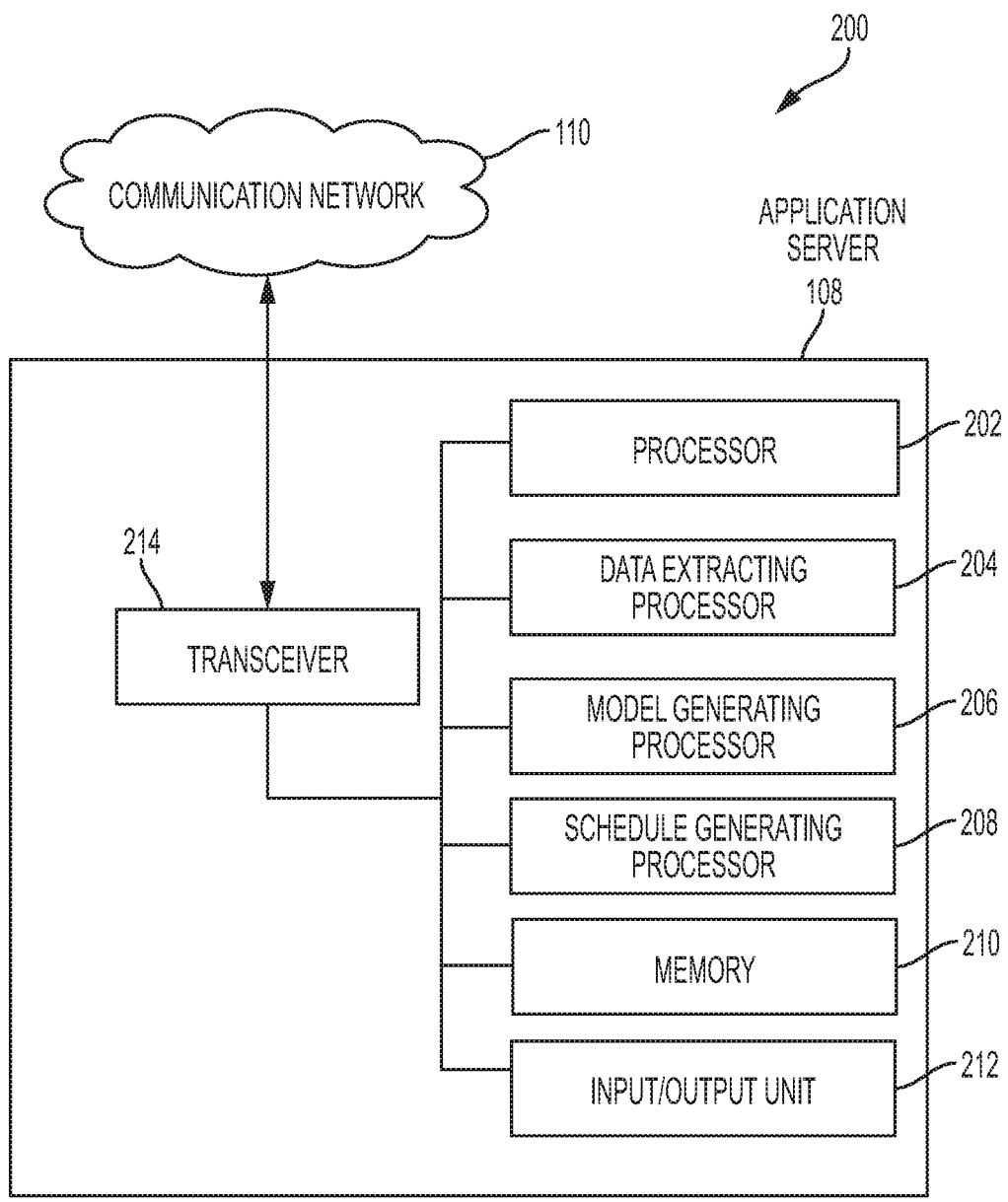
FIG. 2 is a block diagram that illustrates an exemplary application server to control the KPI parameters of a transportation system, in accordance with at least one embodiment.

FIG. 2 is a block diagram that illustrates an exemplary application server to control the KPI parameters of a transportation system, in accordance with at least one embodiment. FIG. 2 has been described in conjunction with FIG. 1. With reference to FIG. 2, there is shown a block diagram of the exemplary application server, such as the application server 108 that may include one or more circuits to control the KPI parameters of the transportation system. The one or more circuits may correspond to a processor 202, a data extracting processor 204, a model generating processor 206, a schedule generating processor 208, a memory 210, an input/output (I/O) unit 212, and a transceiver 214. With reference to FIG. 2, there is further shown the communication network 110 (FIG. 1).

In accordance with an embodiment, the processor 202 may be communicatively coupled to the data extracting processor 204, the model generating processor 206, the schedule generating processor 208, the memory 210, the I/O unit 212, and the transceiver 214. The transceiver 214 may be configured to communicate with the commuter-computing device 102, the service provider-computing device 104, and the database server 106, via the communication network 110, under the control of the processor 202.

The processor 202 may include suitable logic, circuitry, code, and/or interfaces that may be configured to execute one or more instructions stored in the memory 210. The processor 202 may further include a computational and control unit (not shown). The computational and control unit may be configured to perform one or more mathematical and logical operations, and may further control the operations. The processor 202 may execute one or more sets of instructions/programs/code/scripts stored in the memory 210 to perform one or more operations for real-time management of the one or more KPI parameters of the transportation system. In an embodiment, the processor 202 may be configured to monitor and control the one or more KPI parameters in an event the one or more transportation services are deployed based on the service schedule generated by the schedule generating processor 208. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, a Complex Instruction Set Computing (CISC) processor, and/or other processors or control circuits.

The data extracting processor 204 may include suitable logic, circuitry, code, and/or interfaces that may be configured to execute one or more instructions stored in the memory 210. The data extracting processor 204 may execute one or more sets of instructions/programs/code/scripts stored in the memory 210 to perform one or more operations. For example, the data extracting processor 204 may be configured to extract the historical commuting characteristics of the one or more commuters from the database server 106. The data extracting processor 204 may be implemented based on a number of processor technologies known in the art. Examples of the data extracting processor 204 may include, but are not limited to, an X86-based processor, a RISC processor, an ASIC processor, a CISC processor, and/or other processors or control circuits.

The model generating processor 206 may include suitable logic, circuitry, code, and/or interfaces that may be configured to execute one or more instructions stored in the memory 210. The model generating processor 206 may execute one or more sets of instructions/programs/code/scripts stored in the memory 210 to perform one or more operations. For example, the model generating processor 206 may be configured to generate a random utility choice model, such as the MNL model, that may capture the historical commuting characteristics of the one or more commuters. The model generating processor 206 may be implemented based on a number of processor technologies known in the art. Examples of the model generating processor 206 may include, but are not limited to, an X86-based processor, a RISC processor, an ASIC processor, a CISC processor, and/or other processors or control circuits.

The schedule generating processor 208 may include suitable logic, circuitry, code, and/or interfaces that may be configured to execute one or more instructions stored in the memory 210. The schedule generating processor 208 may execute one or more sets of instructions/programs/code/scripts stored in the memory 210 to perform one or more operations. For example, the schedule generating processor 208 may be configured to generate the service schedule of the one or more transportation services for the second defined time duration, by use of the MNL model, based on the defined criteria of the transportation system. The schedule generating processor 208 may be further configured to update the generated service schedule to obtain an updated service schedule, based on the real-time feedback data received from the service provider-computing device 104. The schedule generating processor 208 may be implemented based on a number of processor technologies known in the art. Examples of the schedule generating processor 208 may include, but are not limited to, an X86-based processor, a RISC processor, an ASIC processor, a CISC processor, and/or other processors or control circuits.

Though the data extracting processor 204, the model generating processor 206, and the schedule generating processor 208 are depicted as separate entities (FIG. 2), a person skilled in the art will appreciate that the scope of the disclosure is not limited to realizing the functionality of the data extracting processor 204, the model generating processor 206, and the schedule generating processor 208 by the processor 202. In an embodiment, the data extracting processor 204, the model generating processor 206, and the schedule generating processor 208 may be implemented within the processor 202 without departing from the spirit of the disclosure. Further, a person skilled in the art will understand that the scope of the disclosure is not limited to realizing the data extracting processor 204, the model generating processor 206, and the schedule generating processor 208 as hardware components. In an embodiment, the data extracting processor 204, the model generating processor 206, and the schedule generating processor 208 may be implemented as a software module included in computer program code (stored in the memory 210), which may be executable by the processor 202 to perform the functionalities of the data extracting processor 204, the model generating processor 206, and the schedule generating processor 208.

The memory 210 may comprise suitable logic, circuitry, interfaces, and/or code that may be configured to store one or more machine codes and/or computer programs having at least one code section executable by the processor 202, the data extracting processor 204, the model generating processor 206, the schedule generating processor 208, the I/O unit 212, and the transceiver 214. The memory 210 may store the one or more sets of instructions that are executable by the processor 202, the data extracting processor 204, the model generating processor 206, the schedule generating processor 208, the I/O unit 212, and the transceiver 214. In an embodiment, the memory 210 may include one or more buffers (not shown). The one or more buffers may be configured to temporarily store the extracted historical commuting characteristics of the one or more commuters. The one or more buffers may further temporarily store the one or more KPI parameters and the associated minimum desired values, the defined criteria, current operation status of the one or more transportation services, current service demand, and/or the like. Examples of some commonly known memory implementations may include, but are not limited to, a random access memory (RAM), a read only memory (ROM), a hard disk drive (HDD), and a secure digital (SD) card. In an embodiment, the memory 210 may include the one or more machine codes, and/or computer programs that are executable by the processor 202, the data extracting processor 204, the model generating processor 206, and the schedule generating processor 208 to perform specific operations for controlling KPI parameters of the transportation system. It will be apparent to a person having ordinary skills in the art that the one or more instructions stored in the memory 210 may enable the hardware of the application server 108 to perform the one or more operations, without deviating from the scope of the disclosure.

The I/O unit 212 may comprise suitable logic, circuitry, interfaces, and/or code that may be configured to provide an output to a service provider of the transportation system. The I/O unit 212 comprises various input and output devices that are configured to communicate with the processor 202, the data extracting processor 204, the model generating processor 206, and the schedule generating processor 208. Examples of the input devices include, but are not limited to, a keyboard, a mouse, a joystick, a touch screen, a microphone, a camera, and/or a docking station. Examples of the output devices include, but are not limited to, a display screen and/or a speaker.

The transceiver 214 may comprise suitable logic, circuitry, interfaces, and/or code that may be configured to receive/transmit the one or more queries, requests, user preferences, historical commuting characteristics and/or other information from/to one or more computing devices or servers (e.g., the commuter-computing device 102, the service provider-computing device 104, and/or the database server 106) over the communication network 110. The transceiver 214 may be designed using one or more known technologies to support wired or wireless communication with the communication network 110. In an embodiment, the transceiver 214 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 214 may communicate via wireless communication with networks, such as the Internet, Intranet and/or a wireless network, such as a cellular telephone network, a wireless local area network (LAN) and/or a metropolitan area network (MAN). The wireless communication may use any of a plurality of communication standards, protocols, and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
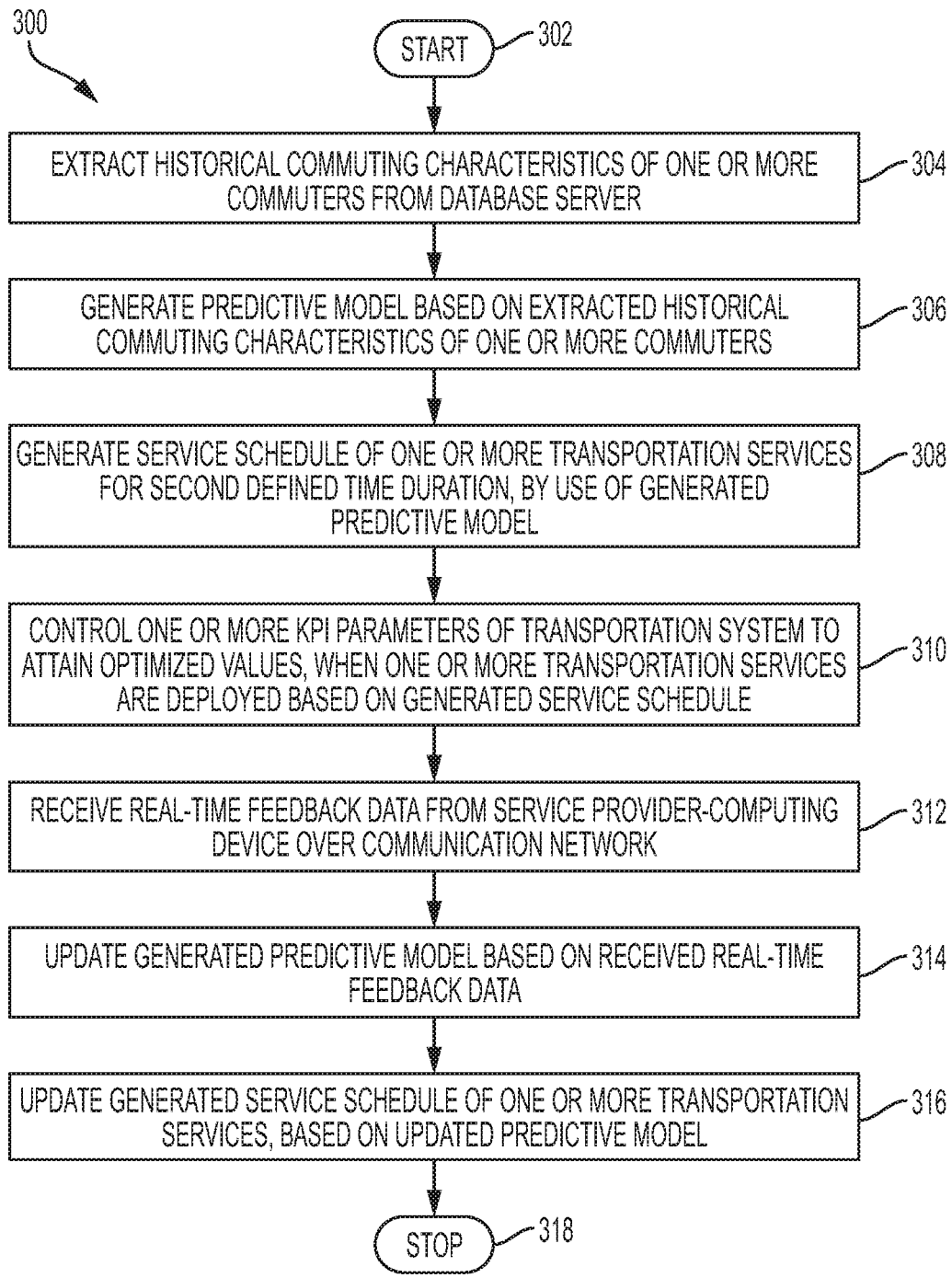
FIG. 3 is a flowchart that illustrates exemplary operations to control the KPI parameters of a transportation system, in accordance with at least one embodiment.

FIG. 3 is a flowchart that illustrates exemplary operations to control the KPI parameters of a transportation system, in accordance with an embodiment. FIG. 3 is described in conjunction with FIG. 1 and FIG. 2. With reference to FIG. 3, there is shown a flowchart 300 that illustrates a method for controlling the KPI parameters of the transportation system. The method starts at step 302 and proceeds to step 304.

At step 304, the historical commuting characteristics of the one or more commuters are extracted from the database server 106. The historical commuting characteristics may comprise the commuting history of the one or more commuters who may have traveled between at least two locations (or stations) using the one or more transportation services in the past. In an embodiment, the data extracting processor 204 may be configured to extract the historical commuting characteristics from the database server 106. The extraction of the historical commuting characteristics from the database server 106 may be further limited by the first defined time duration. The service provider of the transportation service may utilize the service provider-computing device 104 to define the first time duration. Based on the first defined time duration, the data extracting processor 204 may extract the historical commuting characteristics that are associated with the first defined time duration. For example, in an event the service provider defines the first time duration as "1 month," the data extracting processor 204 may extract the historical commuting characteristics of the last "1 month" from the database server 106. Further, in an embodiment, the historical commuting characteristics may be indicative of the source location and the destination location of each of the one or more commuters. Further, the historical commuting characteristics may be indicative of the one or more preferences for the one or more transportation services of each of the one or more commuters. The historical commuting characteristics may be further indicative of the frequency of travel of each of the one or more commuters between one or more pairs of locations or stations. The historical commuting characteristics may be further indicative of other travel-related constraints of each of the one or more commuters. For example, the other travel-related constraints of a commuter may comprise maximum time duration for travel between the source location and the destination location, maximum service cost that the commuter may pay for the travel, and a maximum service capacity of a vehicle. After extraction of the historical commuting characteristics of the one or more commuters, the data extracting processor 204 may store the extracted historical commuting characteristics in a storage device, such as the database server 106 or the memory 210.

At step 306, the predictive model may be generated based on the extracted historical commuting characteristics of the one or more commuters. The predictive model may correspond to a random utility choice model, such as the MNL model. In an embodiment, the model generating processor 206 may be configured to generate the predictive model based on the extracted historical commuting characteristics. The model generating processor 206 may employ one or more techniques such as, but not limited to, one or more statistical techniques, one or more natural language processing techniques, one or more neural network techniques, and/or one or more machine learning techniques to generate the predictive model, for example, the MNL model, based on at least the historical commuting characteristics.

Using the MNL choice model, the processor 202, in conjunction with the schedule generating processor 208, optimizes for the service schedule that may maximize the one or more KPI parameters, for example, the net revenue, for the service provider. Such optimization for the schedule may be obtained in two ways. Firstly, when the service provider may have no restriction on the count or types of the one or more transportation services to be deployed (i.e., uncapacitated case). Secondly, when the service provider may have a restriction on the count or types of the one or more transportation services to be deployed (i.e., capacitated case). For example, the service provider cannot run more than "N" services (possibly due to resource constraints). The above two cases (i.e., uncapacitated case and capacitated case) have been described in detail, for example, in FIG. 4A and FIG. 4B.

At step 308, the service schedule of the one or more transportation services for the second defined time duration may be generated, by use of generated predictive model. The service schedule of the one or more transportation services may correspond to a time table of deploying the one or more transportation services of different service types from their origin location for transit along the one or more routes at the one or more time stamps of the second defined time duration. In an embodiment, the schedule generating processor 208 may be configured to generate the service schedule of the one or more transportation services for the second defined time duration, by use of at least the generated predictive model, for example, the MNL model that captures the historical commuting characteristics of the one or more commuters. The service schedule of the one or more transportation services for the second defined time duration may be further generated based on the defined criteria of the transportation system. The defined criteria may comprise the one or more parameters based on at least one of the count, the type, and the capacity of the one or more transportation services. The defined criteria may comprise availability of the one or more transportation services for travel along the one or more routes during the second defined time duration.

Further, in an embodiment, the service schedule of the one or more transportation services for the second defined time duration may be generated based on the service cost for travel between each pair of locations by each of the one or more transportation services.

For example, the processor 202 may be configured to generate a commuter preference vector and a service cost vector. The commuter preference vector may be generated based on the extracted historical commuting characteristics of the one or more commuters. Each numerical value in the commuter preference vector may indicate a degree of preference of the one or more commuters for travel along the one or more routes by the one or more transportation services. The service cost vector may be generated based on the service cost associated with each of the one or more transportation services. The travel costs in the generated service cost vector may be arranged in a decreasing order. Based on the generated commuter preference vector and service cost vector, the schedule generating processor 208 may generate the service schedule of the one or more transportation services. The schedule generating processor 208 may further store the generated service schedule in the storage device, such as the database server 106 or the memory 210. In another embodiment, the schedule generating processor 208 may present the generated service schedule at the GUI rendered on the display screen of the service provider-computing device 104.

At step 310, the one or more KPI parameters of the transportation system may be controlled to attain the optimized values, when the one or more transportation services may be deployed based on the generated service schedule. The optimized values may correspond to the one or more desired KPI parameters that may be essential for the growth and success of the transportation system, as well as comfort and satisfaction of the one or more commuters. In an embodiment, the processor 202 may be configured to control the one or more KPI parameters to attain the optimized values. The one or more KPI parameters may be controlled, when the one or more transportation services have been deployed for transit at a time stamp in the second user-defined time duration, based on the generated service schedule.

At step 312, the real-time feedback data may be received from the service provider-computing device 104 over the communication network 110. The received real-time feedback data may correspond to the controlled one or more KPI parameters, when the one or more transportation services have been deployed at the time stamp in the second defined time duration. The processor 202 may be configured to receive the real-time feedback data from the service provider-computing device 104 over the communication network 110. The service provider may provide the real-time feedback data in an event the current one or more KPI parameters are below the one or more desired KPI parameters. The processor 202 may store the received real-time feedback data in the storage device, such as the database server 106 or the memory 210.

At step 314, the generated predictive model may be updated based on the received real-time feedback data. The model generating processor 206 may be configured to update the generated predictive model based on the received real-time feedback data to obtain an updated predictive model, for example, an updated MNL model.

At step 316, the generated service schedule of the one or more transportation services may be updated based on the updated predictive model. In an embodiment, the schedule generating processor 208 may be configured to update the generated service schedule for the one or more other time stamps in the second defined time duration, based on the updated predictive model. The generated service schedule may be updated such that the one or more KPI parameters attain at least the optimized values. Based on the updated service schedule, the service provider may deploy the one or more transportation services at the one or more other time stamps in the second defined time duration for transit along the one or more routes. Control passes to end step 318.

A person having ordinary skills in the art will understand that the abovementioned exemplary operations are for illustrative purpose and should not be construed to limit the scope of the disclosure. Further, the abovementioned exemplary operations may be implemented or executed in two settings, for example, an offline setting and an online setting. In the offline setting, the extracted historical commuting characteristics of the one or more commuters are taken as an input to generate the predictive model, such as the MNL model, that may be further utilized to generate the service schedule that maximizes the one or more KPI parameters for the service provider. In the online setting, the service schedule may be generated for the one or more time stamps of the second defined time duration. Further, the one or more transportation services may be deployed for transit at a time stamp of the one or more time stamps, based on the generated service schedule. In response to such deployment, the processor 202 may receive the real-time feedback data in terms of the net revenue collected or any other KPI parameter for the time stamp. Based on the received real-time feedback data, the predictive model may be updated and thereafter, determines new schedules that can be deployed in the one or more other time stamps that potentially may lead to higher revenues/KPI. The abovementioned exemplary operations for the offline setting have been described, for example, in FIG. 4A. Similarly, the abovementioned exemplary operations for the online setting have been described, for example, in FIG. 4B.

Figure 4A:
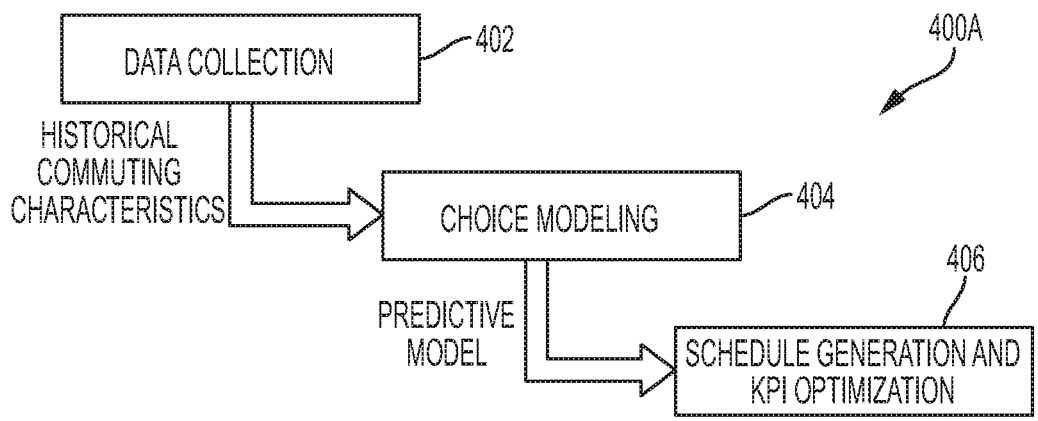
FIG. 4A is a block diagram that illustrates an exemplary scenario to control the KPI parameters of a transportation system in an offline setting, in accordance with at least one embodiment.

FIG. 4A is a block diagram that illustrates an exemplary scenario to control the KPI parameters of a transportation system in an offline setting, in accordance with at least one embodiment. FIG. 4A has been described in conjunction with FIG. 1, FIG. 2, and FIG. 3. With reference to FIG. 4A, there is shown exemplary block diagrams, such as a data collection block 402, a choice modeling block 404, and a schedule generation and optimization block 406, as shown.

The data collection block 402 comprises the historical commuting characteristics (of the one or more commuters) that may be extracted by the data extracting processor 204 from the database server 106. The processor 202 may further output the historical commuting characteristics from the data collection block 402 to the choice modeling block 404. The model generating processor 206 may construct the predictive model (e.g., the MNL model) based on the historical commuting characteristics. The predictive model may be indicative of a conditional distribution of the historical commuting characteristics of the one or more commuters. Further, the processor 202 may output the generated predictive model to the schedule generation and optimization block 406. The schedule generating processor 208 may generate the service schedule of the one or more transportation services using the generated predictive model, for example, the MNL model. By use of the MNL model in the schedule generation, the service schedule may be optimized such that the one or more KPI parameters, for example, net revenue or net profit, for the service provider may be maximized. Such optimization of the service schedule may be obtained in two ways, for example, an unconstrained case and a constrained case.

Offline Optimization: Uncapacitated Case

In an embodiment, the optimal assortment for the uncapacitated assortment optimization problem with the MNL model is revenue ordered set. Let the one or more transportation services (of different types, timings, and/or prices) be indexed from "1" to "n" in the decreasing order of prices. Then, the revenue ordered set may be a set, $S=\{1, 2, \ldots, j\}$, for some j. Thus, instead of $2^n$ assortments in the service schedule, the processor 202 may look for the optimal assortment only in "n" revenue ordered assortments, where n is the number of transportation services. In such cases, the revenue of the revenue ordered assortments may be weakly unimodal. This property may enable the use of faster search algorithms, such as Golden Section Search, and hence, obtain the optimal revenue ordered assortment in time O(log n).

Let the commuter preference vector be represented as $v=v_0, v_1, \ldots, v_n$ and the service cost vector be represented as $p=p_1, p_2, \ldots, p_n$. Further, assume that the transportation services have already been sorted in the decreasing order of their prices. Let f(A,v) denote the revenue of the set A of transportation services. Thus, based on the MNL model, $$f(A, v) = \frac{\sum_{l \in A} p_l v_l}{v_0 + \sum_{l \in A} v_l} \quad (1)$$

Let g(i, v) denote the revenue of the set $\{1, 2, \ldots i\}$ when the commuter preference vector is v.
Thus, $$g(i, v) = f(\{1, 2, \ldots i\}, v) = \frac{\sum_{j=1}^{i} p_j v_j}{\sum_{j=0}^{i} v_j} \quad (2)$$

Offline Optimization: Capacitated Case

The assortment optimization problem with a capacity constraint (C) does not offer the same structural properties as the uncapacitated problem. The currently known algorithm to solve this problem has time complexity $O(n^2 \log n)$. Thus, due to advancement in linear programming coding techniques, the processor 202 may utilize the linear programming method to obtain the optimal assortment for the capacitated assortment optimization problem with the MNL model. The key feature of the linear programming method is its low computation complexity making it suitable for applications with large number of transportation services. Further, such a method may take limited time to compute the optimal assortment. For example, the revenue optimization problem may be naively written as an integer non-linear program as follows:

$$\max \frac{\sum_{i=1}^{n} p_i v_i x_i}{v_0 + \sum_{i=0}^{n} v_i x_i} \quad (3)$$

such that, $\Sigma_{i=1}^{n} x_i < C$ and $x_i \in \{0,1\}$.

Here $x_i$ is the decision variable that indicates whether the transportation service i should be included in the optimal assortment or not. It turns out that the following linear programming reformulation without integer constraints is equivalent to the above problem:

$$\max \Sigma_{i=1}^{n} p_i z_i \quad (4)$$

such that, $$z_0 + \sum_{i=1}^{n} z_i = 1;$$

$$\sum_{i=1}^{n} \frac{z_i}{v_i} \leq \frac{z_0}{v_0} C; \text{ and}$$

$$0 \leq \frac{z_i}{v_i} \leq \frac{z_0}{v_0} \; \forall \, i \in [n]$$

The variables here are $z_i$ that are continuous valued. In fact these quantify a likelihood of purchase, i.e., $$z_i = \frac{v_i x_i}{v_0 + \sum_j v_j x_j}.$$

Thus, given a solution of $\{z_0, z_1, \ldots, z_n\}$, the processor 202 may easily find the assortment solution $\{x_1, \ldots, x_n\}$. Further, this linear program may be efficiently solved using off-the-shelf LP solvers, such as CPLEX, very efficiently for even large assortment optimization instances.

Figure 4B:
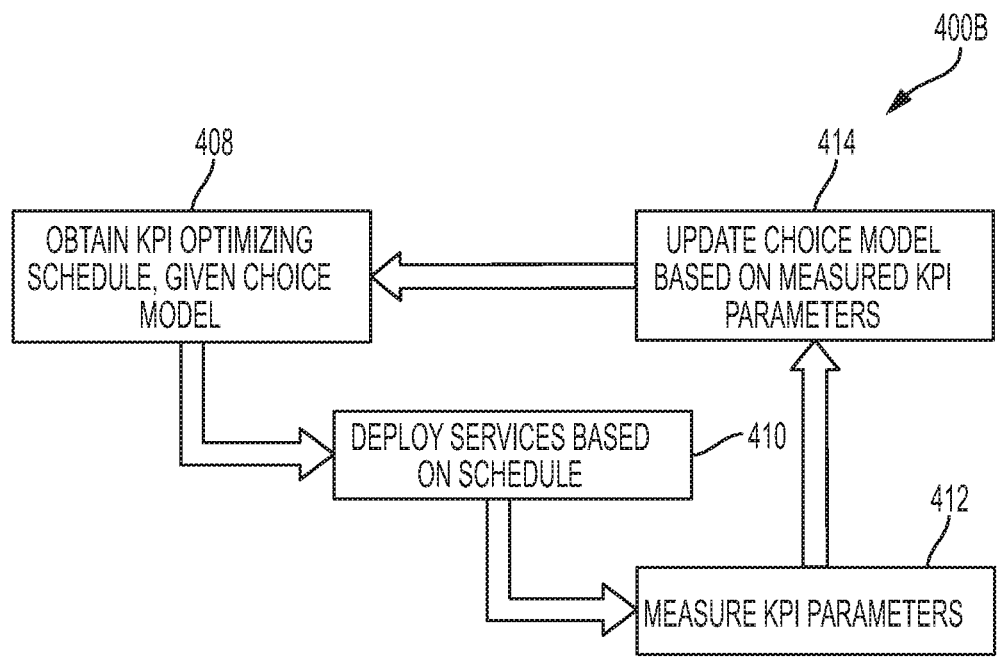
FIG. 4B is a block diagram that illustrates an exemplary scenario to control the KPI parameters of a transportation system in an online setting, in accordance with at least one embodiment.

FIG. 4B is a block diagram that illustrates an exemplary scenario to control the KPI parameters of a transportation system in an online setting, in accordance with at least one embodiment. FIG. 4B has been described in conjunction with FIG. 1, FIG. 2, and FIG. 3. With reference to FIG. 4B, there is shown an exemplary block diagram to illustrate the exemplary operations in the online setting. For example, given the choice model, for example, the MNL model, the KPI optimizing schedule may be obtained (denoted by 408). The schedule generating processor 208 may generate the service schedule that may optimize the one or more KPI parameters. Based on the service schedule, the one or more transportation services may be deployed (denoted by 410). The one or more transportation services may be deployed for transit along the one or more routes at a time stamp of the one or more time stamps in the second defined time duration. Further, the one or more KPI parameters may be monitored on the service provider-computing device 104. The processor 202 may measure the one or more KPI parameters (denoted by 412). Further, the processor 202 may display the measure of the one or more KPI parameters on the display screen of the service provider-computing device 104. Based on the measured one or more KPI parameters, the MNL model may be updated (denoted by 414). Thereafter, the schedule generating processor 208 may update the service schedule for the one or more other time stamps in the second defined time duration. Based on the updated service schedule, the service provider may deploy the one or more transportation services at the one or more other stamps so as to attain enhanced growth in terms of the one or more KPI parameters. Such optimization of the service schedule may be obtained in two ways, for example, an unconstrained case and a constrained case.

Online Optimization: Uncapacitated Case

In the online setting where the commuters' commuting characteristics are being learnt and the optimal assortment of the service schedule needs to be presented in real time in accordance with the latest estimates, the assortment optimization problem may need to be solved repeatedly as the one or more KPI parameters are updated. In such cases, the processor 202 may update at most one parameter in one iteration. The processor 202 may evaluate intervals around the current parameters in which the optimal assortment remains the same after the update. The processor 202 may further evaluate the new optimal assortment for all possible values of change in any one of the parameters. For the below discussion, the following assumptions have been made: Firstly, the service prices of all the transportation services are distinct. Secondly, all the components of the commuter preference vector are non-zero.

Let the estimate of the commuter preference vector at the beginning of the $t^{th}$ round be $v^t$. Let the index of the component updated at the end of the $t^{th}$ round be $k_t$. Thus, $$v_i^t = v_i^{t-1} + \delta_t, \text{ if } i = k_{t-1}$$
$$= v_i^{t-1}, \text{ otherwise}$$

where, $$\delta_t > -v_i^{t-1}.$$

Now, $$g(i, v) = \frac{\sum_{i=1}^{i} p_i v_i}{\sum_{i=0}^{i} v_i}.$$

Thus, $$g(i, v^t) = g(i, v^{t-1}) \text{ if } i < k_{t-1}.$$

As the optimal assortment in every round is a revenue ordered assortment, let the optimal assortment in the $t^{th}$ round be 1, 2, . . . , $j_t^*$. If $j_{t-1}^* < k_{t-1} - 1$, then $g(i, v^t) = g(i, v^{t-1})$ for $i \leq j_{t-1}^* + 1$.

Further, in an event $j_{t-1}^* < k_{t-1} - 1$, the following inequalities (denoted by equations 5 and 6) must be satisfied:

$$\delta_{t-1}(p_{j_{t-1}^*} - p_{k_{t-1}}) 1(k_{t-1} \leq j_{t-1}^* - 1) > \sum_{i=0}^{j_{t-1}^*-1}(p_i - p_{j_{t-1}^*}) v_i^{t-1} \quad (5)$$

$$\delta_{t-1}(p_{1+j_{t-1}^*} - p_{k_{t-1}}) 1(k_{t-1} \leq j_{t-1}^*) \leq \sum_{i=0}^{j_{t-1}^*}(p_i - p_{1+j_{t-1}^*}) v_i^{t-1} \quad (6)$$

where,

1(·) represents the indicator function.

In the event that $\delta_{t-1}$ may not lie in an interval specified by the equations (5) and (6), the processor 202 may have to search for the optimal assortment after the commuter preference vector has been updated from $v_{t-1}$ to $v_t$. Further, if equation (5) is satisfied (i.e., holds true), then $g(j_{t-1}^* - 1, v^t) < g(j_{t-1}^*, v^t)$ and $j_t^* \geq j_{t-1}^*$ and vice-versa, i.e., if equation (5) is not satisfied, then $j_t^* < j_{t-1}^*$. Similarly, if equation (6) is satisfied (i.e., holds true), then $g(j_{t-1}^*, v^t) > g(j_{t-1}^* + 1, v^t)$ and $j_t^* \leq j_{t-1}^*$ and vice-versa. Such observations may be utilized by the processor 202 to narrow down the search space for the optimal revenue ordered assortment.

In the above discussion, the conditions are described under which the optimal assortment may remain same after the commuter preference vector may have been updated. Using the same approach, the conditions under which the optimal assortment characterized by $j_t^*$ that may take a particular value have been mentioned below: Let $j_t^* = j_{t-1}^* + m_t$. Thus, $p_{j_t^*} > g(j_t^* - 1, v^t)$ and $p_{1+j_t^*} \leq g(j_t^*, v^t)$.

The first condition implies that:

$$\delta_{t-1}(p_{j_{t-1}^* + m_t} - p_{k_{t-1}}) 1(k_{t-1} \leq j_{t-1}^* + m_t - 1) > \sum_{i=0}^{j_{t-1}^* + m_t - 1}(p_i - p_{j_{t-1}^* + m_t}) v_i^{t-1} \quad (7)$$

The second condition implies that:

$$\delta_{t-1}(p_{j_{t-1}^* + m_t} - p_{k_{t-1}}) 1(k_{t-1} \leq j_{t-1}^* + m_t) \leq \sum_{i=0}^{j_{t-1}^* + m_t}(p_i - p_{1+j_{t-1}^* + m_t}) v_i^{t-1} \quad (8)$$

Online Optimization: Capacitated Case

The sensitivity analysis for the assortment optimization problem with constraints having unimodular constraint structures, such as capacity constraints, precedence constraints, constraints on quality consistent pricing, may be formulated as a set of unimodular constraints. Such a problem may be formulated as a linear program. Based on the update in one of the choice parameters, an entire column of the constraint matrix of the linear program may change. The processor 202 may be configured to execute the sensitivity analysis under such changes and derive a range of parameters under which the optimal assortment may remain unchanged. The following linear program may be utilized to find the optimal assortment with the unimodular constraints:

$$\max \Sigma_{j \in N} p_j w_j \quad (9)$$

such that, $$\sum_{j \in N} w_j + w_0 = 1;$$

$$\sum_{j \in N} d_{ij} \frac{w_j}{v_j} \leq b_i w_0 \; \forall \; i \in M; \text{ and}$$

$$0 \leq \frac{w_j}{v_j} \leq w_0 \; \forall \; j \in N.$$

where the feasible offer set is given by $F = \{x \in \{0,1\}^{|N|} : \Sigma_{j \in N} d_{ij} x_j \leq b_i, \forall i \in M\}$, and $x_j = 1(0)$ may represent the $i^{th}$ transportation service that is offered (not offered) in the assortment. The $ij^{th}$ entry of the constraint matrix of the above linear program in the $t^{th}$ iteration may be represented as $a_{ij}(t)$. Let the size of the constraint matrix be e×f. In an event the update is made in the commuter preference vector v, multiple entries of the constraint matrix of the above linear program may change. Note that if in the $t^{th}$ round, the $k_t^{th}$ component of $v^t$ is updated, then only entries of the $k_t^{th}$ column in the constraint matrix may change. The permissible intervals for any component of v may depend on whether the component is a basic variable or not in the basic feasible solution of the linear program. To simplify notation, it may be assumed that the first e variables are the basic variables. Let the reduced costs of the variables at the end of $(t-1)^{th}$ round be $r(t-1) = <r^j(t-1):l=1, 2, \ldots f>$. Further, let the elements of the inverse of the basis matrix be $b_{ij}$ (i,j= 1, 2, . . . , m). Let's consider a case when the $k_{t-1}^{th}$ variable may be a non-basic variable. For each element $a_{il}$ of the constraint matrix (where $x_l$ is a non-basic variable), the processor 202 may determine a range of values such that the new reduced cost of all the variables still remains non-positive. Thus, $r_l(t-1) - \Delta a_{il} \Sigma_{j=1}^{m} p_j b_{ji} \leq 0$, where $\Delta a_{il} = a_{il}(t) - a_{il}(t-1)$. This may result in a range of acceptable values of $\Delta a_{il}$. The range may be denoted by $[-L_{il}, U_{il}]$. Further, $\Delta a_{il}^*$ and $\lambda_i$ may be defined as follows:

$$\Delta a_{il}^* = \begin{cases} U_{il} & \text{if } \Delta a_{il} > 0 \\ -L_{il} & \text{if } \Delta a_{il} < 0 \\ 0 & \text{if } \Delta a_{il} = 0 \end{cases}$$

$$\lambda_i = \begin{cases} \frac{\Delta a_{il}}{\Delta a_{il}^*} & \text{if } \Delta a_{il} \neq 0 \\ 0 & \text{otherwise} \end{cases}$$

In the event of $\Delta a_{il} \in [-L_{il}, U_{il}] \forall i \in [1,f]$ and $\Sigma_{i=1}^{e} \lambda_i \leq 1$, the optimal basis of the updated linear program may be same as that of the original linear program. Moreover, the optimal revenue and the revenue-maximizing assortment remains the same. Thus, for a given change in the commuter preference vector v, the changes in the constraint matrix may be computed. If the change in the constraint matrix satisfies the above conditions, the optimal assortment remains unchanged.

Further, considering the case when the $k_{r-1}^{th}$ component is a basic variable in the optimal solution of the linear program at the $(t-1)^{th}$ iteration, the $i^{th}$ column of the inverse of the basis matrix may be denoted by b' of the optimal solution obtained at the end of the $(t-1)^{th}$ iteration. Also, let the optimal solution at the end of the $(t-1)^{th}$ iteration be $w^*(t-1) = (w^*(t-1)_B w^*(t-1)_N)$, where $w^*(t-1)_B$ and $w^*(t-1)_N$ may represent the basic and non-basic components, respectively. For each element $a_{il}$, a range of values for which the current solution remains feasible and optimal may be given by the following conditions:

$$M = 1 + b_{ij} \Delta a_{il} > 0;$$

$$M w^*(t-1)_B - \Delta a_{il} w^*(t-1)_i b^i \geq 0; \text{ and}$$

$$M r_j(t-1) + a_{ij}^* \Delta a_{ji} (\Sigma_{s=1}^{e} p_s b_{si}) \leq 0 \text{ for } e+1 \leq j \leq f.$$

The above conditions may determine the range of $\Delta a_{il}$, denoted by $[-L_{il}, U_{il}]$ that may be defined as discussed above. In the event of $\Delta a_{il} \in [-L_{il}, U_{il}] \forall i \in [1,f]$ and $\Sigma_{i=1}^{e} \lambda_i \leq 1$, the optimal basis of the updated linear program may be same as that of the original linear program.

Regret Minimizing Online Optimization:

Given a set N of n products and a capacity C, the assortment optimization problem is to look for the best possible assortment $S \subset N$ such that $|S| < C$ and the associated revenue is as large as possible. In this section, a parallelism has been drawn between the assortment optimization problem and the multi-armed bandit (MAB) problem. The different possible assortments represent the different arms of the MAB. Each of the arms may be associated with a reward. In each round, the processor 202 may select an arm (assortment), and thereafter, present the selected arm to the commuter. Based on what the commuter chooses, the processor 202 may compute the revenue. At a particular round, the processor 202 may have no information with regard to the revenue when some other arm is chosen. It is thus a Semi-Bandit setting. In this case, let $a_t$ denote the arm chosen. Then, the revenue received for chosen arm may be $y_t[a_t]$. Here, the goal is to have low regret for not always pulling the best arm, i.e. not always showing the optimal assortment. In scenarios when instead of 'at-most C' products, exactly C products are shown, the total number of arms is thus N choose C. As in the rest of the disclosure, the MNL Choice Model has been used to characterize the behavior of the commuter. Specifically if the commuter preference vector is given by $v = [v_1, \ldots, v_n]$, then given an assortment A, the likelihood of choosing a product $i \in A$ is given by, $$P(\text{product } i \text{ chosen}) = \frac{v_i}{v_0 + \sum_{l \in \mathcal{A}} v_l},$$

where $v_0$ may correspond to no product being selected. If the prices associated with the products are $p_1, p_2, \ldots, p_n$, then the expected revenue is given by $$f(\mathcal{A}, v) = \frac{\sum_{l \in \mathcal{A}} p_l v_l}{v_0 + \sum_{l \in \mathcal{A}} v_l}.$$

Further, in an embodiment, the processor 202, in conjunction with the schedule generating processor 208, may be configured to generate a regret minimizing service schedule in an event the true underlying commuter choice behavior may not be known in advance and may be learned via feedback. A known algorithm, such as an Online Mirror Descent (OMD) algorithm, may be used to achieve the regret minimizing service schedules.

The disclosed embodiments encompass numerous advantages. The disclosure provides a method and a system for controlling KPI parameters of the transportation system. The disclosed method maximizes the revenue and other key performance indicators for the service provider of the transportation systems by taking commuter choice behavior in to account and also by learning the changing commuter choice behaviors over a period of time. This may be applicable when the transportation services are differently priced and the commuters have alternate commuting choices. The disclosure assumes a commuter choice model (e.g., the Multinomial Logit model) and gives an optimal offline algorithm to optimize the revenue and other key performance indicators when the service provider has no restriction on the number of services of each type that may be deployed. When the capacity is limited, the disclosure proposes an approximate algorithm for optimizing the revenue and other key performance indicators that is faster and scalable as compared to existing approaches. The disclosure also proposes a sensitivity analysis-based scheme for adjusting the schedules to choice parameters being estimated and updated in real time. The sensitivity analysis-based scheme prevents re-solving the revenue optimized scheduling problem unless the effect is significant, and hence minimizes wastage of computational resources. Finally, the disclosure proposes an explore-exploit based method to learn commuter choices and find the optimal schedule. This can also be deployed as an adaptive system to adapt the schedules to changing commuter choices over time.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for controlling KPI parameters of a transportation system have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for deploying transportation services of a transportation system, said method comprising:

extracting, by a data extracting processor at a computing server, historical commuting characteristics of one or more commuters, from a database server over a communication network, based on a first user-defined time duration;

generating, by a model generating processor at said computing server, a predictive model based on said extracted historical commuting characteristics of said one or more commuters, wherein said predictive model comprises a commuter preference vector and a service cost vector and generating said predictive model comprises generating the commuter preference vector and the service cost vector;

generating, by the schedule generating processor at said computing server, a service schedule of one or more transportation services of said transportation system for a second user-defined time duration, by use of said generated predictive model, based on defined criteria of said transportation system and based on the commuter preference vector and the service cost vector;

providing, via a communication network, the service schedule to one or more service provider computing devices of one or more service providers associated with the transportation system;

deploying one or more of the transportation services to travel along one or more routes during the second user-defined time duration according to the service schedule;

receiving, from one or more of the service provider computing devices associated with the deployed transportation services, via the communication network, real time feedback of a KPI parameter associated with the deployed transportation services; and in response to receiving the real time feedback, updating the predictive model and determining whether to generate an updated service schedule to attain a desired KPI parameter for the transportation system by:

determining an interval within which the commuter preference vector may change without affecting an assortment selected by the predictive model;

updating the predictive model by determining an updated commuter preference vector based on the real-time feedback of the KPI parameter associated with the deployed transportation services; and determining, based on whether an amount of change from the commuter preference vector to the updated commuter preference vector is within the determined interval, whether to generate an updated service schedule based on the updated commuter preference vector.

2. The method of claim 1, wherein said historical commuting characteristics of said one or more commuters depends on at least one of a source location, a destination location, a travel time, a travel cost, a service capacity, and a travel route.

3. The method of claim 1, wherein said KPI parameter associated with the deployed transportation services corresponds to at least one of a net revenue generated by said deployment of said one or more transportation services along one or more routes, a net profit of said transportation system based on said deployment of said one or more transportation services, and a count of commuters carried by said one or more transportation services.

4. The method of claim 1, wherein said generation of said commuter preference vector is based on said extracted historical commuting characteristics of said one or more commuters.

5. The method of claim 1, wherein said generation of said service cost vector is based on a travel cost associated with each of said one or more transportation services of said transportation system, wherein a plurality of travel costs in said service cost vector are arranged in a decreasing order.

6. The method of claim 1, wherein said predictive model corresponds to a random utility choice model that captures commuting characteristics of said one or more commuters.

7. The method of claim 1, wherein said defined criteria comprise one or more parameters based on at least one of a count, a type, and a capacity of said one or more transportation services to be deployed by said transportation system during said second user-defined time duration.

8. A system for deploying transportation services of a transportation system, said system comprising:
- a data extracting processor configured to extract historical commuting characteristics of one or more commuters, from a database server over a communication network, based on a first user-defined time duration;
- a model generating processor configured to generate a predictive model based on said extracted historical commuting characteristics of said one or more commuters, wherein said predictive model comprises a commuter preference vector and a service cost vector and generating said predictive model comprises generating the commuter preference vector and the service cost vector;
- a schedule generating processor configured to generate a service schedule of one or more transportation services of said transportation system for a second user-defined time duration, by use of said generated predictive model, based on defined criteria of said transportation system and based on the commuter preference vector and the service cost vector; and
- a processor configured to
  provide, via a communication network, the service schedule to one or more service provider computing devices of one or more service providers associated with the transportation system;
  deploy one or more of the transportation services to travel along one or more routes during the second user-defined time duration according to the service schedule;
  receive, from one or more of the service provider computing devices associated with the deployed transportation services, via the communication network, real time feedback of a KPI parameter associated with the deployed transportation services; and
  in response to receiving the real time feedback, update the predictive model and determine whether to generate an updated service schedule to attain a desired KPI parameter for the transportation system by:
    determining an interval within which the commuter preference vector may change without affecting an assortment selected by the predictive model;
    updating the predictive model by determining an updated commuter preference vector based on the real-time feedback of the KPI parameter associated with the deployed transportation services; and
    determining, based on whether an amount of change from the commuter preference vector to the updated commuter preference vector is within the determined interval, whether to generate an updated service schedule based on the updated commuter preference vector.

9. The system of claim 8, wherein said historical commuting characteristics of said one or more commuters depends on at least one of a source location, a destination location, a travel time, a travel cost, a service capacity, and a travel route.

10. The system of claim 8, wherein said generation of said commuter preference vector is based on said extracted historical commuting characteristics of said one or more commuters.

11. The system of claim 8, wherein said generation of said service cost vector is based on a travel cost associated with each of said one or more transportation services of said transportation system, wherein a plurality of travel costs in said service cost vector are arranged in a decreasing order.

12. The system of claim 8, wherein said generation of said service schedule is based on at least said commuter preference vector and said service cost vector.

13. The system of claim 8, wherein said predictive model corresponds to a random utility choice model that captures commuting characteristics of said one or more commuters.

14. The system of claim 8, wherein said defined criteria comprise one or more parameters based on at least one of a count, a type, and a capacity of said one or more transportation services to be deployed by said transportation system during said second user-defined time duration.

15. A computer program product for use with a computer, said computer program product comprising a non-transitory computer readable medium, wherein said non-transitory computer readable medium stores a computer program code for deploying transportation services of a transportation system, wherein said computer program code is executable by one or more processors in a computing device to:
- extract historical commuting characteristics of one or more commuters, from a database server over a communication network, based on a first user-defined time duration;
- generate a predictive model based on said extracted historical commuting characteristics of said one or more commuters, wherein said predictive model comprises a commuter preference vector and a service cost vector and generating said predictive model comprises generating the commuter preference vector and the service cost vector;

generate a service schedule of one or more transportation services of said transportation system for a second user-defined time duration, by use of said generated predictive model, based on defined criteria of said transportation system and based on the commuter preference vector and the service cost vector;

provide, via a communication network, the service schedule to one or more service provider computing devices of one or more service providers associated with the transportation system to facilitate deployment of one or more of the transportation services according to the service schedule;

receive, from one or more of the service provider computing devices associated with transportation services that are deployed according to the service schedule during the second user-defined time duration, via the communication network, real time feedback of a KPI parameter associated with the one or more of the transportation services that are deployed during the second user-defined time duration according to the service schedule; and in response to receiving the real time feedback, update the predictive model and determine whether to generate an updated service schedule to attain a desired KPI parameter for the transportation system by:

determining an interval within which the commuter preference vector may change without affecting an assortment selected by the predictive model;

updating the predictive model by determining an updated commuter preference vector based on the real-time feedback of the KPI parameter associated with the deployed transportation services; and determining, based on whether an amount of change from the commuter preference vector to the updated commuter preference vector is within the determined interval, whether to generate an updated service schedule based on the updated commuter preference vector.

16. The method of claim 1, further comprising, in response to determining that the amount of change from the commuter preference vector to the updated commuter preference vector is outside the determined interval, using the predictive model to generate an updated service schedule based on the updated commuter preference vector.

17. The method of claim 1, further comprising in response to determining that the amount of change from the commuter preference vector to the updated commuter preference vector is within the determined interval, refraining from generating an updated service schedule based on the updated commuter preference vector.

18. The system of claim 8, wherein the processor is configured to, in response to determining that the amount of change from the commuter preference vector to the updated commuter preference vector is outside the determined interval, use the predictive model to generate an updated service schedule based on the updated commuter preference vector.

19. The method of claim 1, further comprising, in response to determining that the amount of change from the commuter preference vector to the updated commuter preference vector is within the determined interval, refraining from generating an updated service schedule based on the updated commuter preference vector.

* * * * *